United States Patent
Rumbaugh

(10) Patent No.: US 6,275,144 B1
(45) Date of Patent: Aug. 14, 2001

(54) VARIABLE LOW FREQUENCY OFFSET, DIFFERENTIAL, OOK, HIGH-SPEED POWER-LINE COMMUNICATION

(75) Inventor: Stephen Roy Rumbaugh, Martinez, CA (US)

(73) Assignee: TeleNetwork, Inc., Pleasant Hill, CA (US)

( * ) Notice: Subject to any disclaimer, the term of this patent is extended or adjusted under 35 U.S.C. 154(b) by 0 days.

(21) Appl. No.: 09/614,473

(22) Filed: Jul. 11, 2000

(51) Int. Cl.[7] .................................................. H04M 11/04
(52) U.S. Cl. ............................ 340/310.01; 340/310.02; 340/310.03; 340/310.06; 340/310.07; 340/870.18; 340/870.19; 340/870.31
(58) Field of Search ..................... 340/310.01, 310.02, 340/310.03, 310.06, 310.07, 870.18, 870.19, 870.31

(56) References Cited

U.S. PATENT DOCUMENTS

| | | | |
|---|---|---|---|
| 4,142,178 | * | 2/1979 | Whyte et al. .................... 340/310.01 |
| 4,350,980 | * | 9/1982 | Ward ................................ 340/310.01 |
| 4,357,598 | * | 11/1982 | Melvin et al. ................... 340/310.01 |
| 4,675,648 | * | 6/1987 | Roth et al. ....................... 340/310.01 |
| 4,862,157 | * | 8/1989 | Noel ................................ 340/310.01 |
| 5,994,998 | * | 11/1999 | Fisher et al. .................... 340/310.01 |

* cited by examiner

Primary Examiner—Julie Lieu
(74) Attorney, Agent, or Firm—Blakely, Sokoloff, Taylor & Zafman, LLP

(57) ABSTRACT

A method and system for transmitting data using a low frequency offset, differential voltage, OOK transmission technique have been described. According to one embodiment, an analog or digital signal is sent or received and converted, if necessary, into or from serial format onto or out of a power line. This signal is an OOK modulated sinusoidal offset signal with an associated differential voltage. Next, the transmitted signal is input into an additive coupler which serves as an interface to the power-line network. At the far end, an additive decoupler receives the transmission and sends the frequency out to the designated amplifiers to provide the needed voltages to activate the OOK detection system. This system uses current detection that is activated every time the designated OOK signal frequency is received. Further, the OOK signal is decoded and information split off to the designated leads. Afterwards, the recreated square wave transmission serial bit stream is converted to compatible signaling voltages and sent to the digital computer interface.

12 Claims, 4 Drawing Sheets

VARIABLE LOW FREQUENCY OFFSET, DIFFERENTIAL, OOK, HIGH-SPEED POWER-LINE COMMUNICATION

BACKGROUND OF THE INVENTION

This invention relates to the field of power-line communication (PLC) transmission. This new communication transmission method will operate at transmission rates up to 1.6 gigabits per second capability.

The existing methods for transmitting data communication over the power-line uses various modulation techniques that manipulate a carrier(s) by phase, amplitude and/or frequency. FIG. 1 illustrates a diagram of the conventional modulation techniques used in today's transmission technology.

Referring to FIG. 1, data 10 includes information that may be transmitted over the power line using one of the illustrated transmission techniques. Data 10 is represented by digital signals that are transmitted in strings of binary 1s and 0s. When amplitude modulation technique 20 is used to transmit data 10, the data signal is blended into a carrier by varying the amplitude of the carrier. Specifically, the amplitude is modulated when it corresponds to a binary 0 of the data signal. On-off modulation technique 30 uses a transmitter which is turned off every time the transmitted data signal is represented by a binary 0. When frequency modulation using frequency shift keying (FSK) technique 40 is used, the data signal is blended into a carrier by modulating (shifting) the frequency of the carrier. The frequency shift occurs when a binary 0 in the data signal is encountered. Phase modulation using phase shift keying (PSK) technique 50 shifts the phase (e.g., 180°) when the data signal represented by a binary 0 is transmitted.

Using various modulation techniques, the power-line communication industry has obtained data rates of up to 10 megabits. Some of the above techniques use multiple carrier frequency such as DSS (Digital Spread Spectrum) or OFDM (Orthogonal Frequency Division Multiplexing). The use of spread spectrum and chirping signals used in transmission systems of today also limits the capacity. Using extended duration signaling techniques limits the theoretical transmission rate and rates faster than 40 megabits per second are not practical using such methods.

SUMMARY OF THE INVENTION

The object of the present invention is to provide a power-line communications transmission system that can transmit information at extremely high rates with high quality of service (QoS). By using a differential voltage transmitting an offset low frequency sinusoidal signal, that uses an on-off keying (OOK) modulator at the rate of the data being transmitted, high bandwidth transmission speeds can be achieved. The On/Off state of the low frequency can be injected as an additive magnetic (Passive) element into the power-line alternating current or can be transmitted using an electro magnetically coupled injector (Active) into the magnetic field of the AC power. Using Active coupling, the transmitted information will require the power-line to be energized, however, using the Passive coupling method also allows for communication transmission with the power turned off. One advantage of this invention is that the system is dual coupled and transmits a transverse electromagnetic (T.E.M.) wave with an ultra-wide bandwidth. It is extremely important to be able to transmit reliable, high QoS information, in the home or office with or without the electrical power being on. When using this transmission technique for video, voice and data communications, the invention will provide the QoS required for each service provided. To provide telephone (voice) services to, from and within the home or office, the telephone must work for emergency services when power is out. This invention provides the ability to not only transmit and receive high-speed information, but to do so in any state that the electrical service is in. The transmission of information over power-lines within buildings or a campus environment and over the utility power grid is part of this invention. By modulating a low frequency, offset signal, using OOK differentially, information over the existing power-line infrastructure, speeds of up to 1.6 gigabits per second could be realized.

Another object of the present invention is to provide cable television-type service capabilities over the power-line. If a TV is equipped with this technology of the present invention, all you would need to do is plug the TV set into an AC power source and the TV network interface device will send out a signal to search for compatible devices on the power-line.

Another object of the present invention is to transmit high volumes of voice transmissions (telephone conversations) over power-lines and interconnect this transmission to the existing public telephone network system.

Another object is to use the power-line transmission technology to interface into the wireless transmission equipment environment. This will provide a wireless device, such as a gas meter monitor, to transmit and the power-line device to receive information that can be sent to a network operations center for billing, control and other services that are typical of services required by utility companies.

Another object of the invention is the ability for this technology to be channelized to provide isochronous, asynchronous, synchronous, and bisynchronous transmissions in a time division format. Video and voice would be isochronous and high-speed data transfers between computers would be asynchronous. All information will normally be sent serially.

Another object of the invention is the ability for video, voice and data to be intermixed in the power-line communication system. This will allow applying the invention to, for example, satellite, radio, cellular, microwave, PCS, telephone, audio, Internet & television communication, and to provide transmission from and reception by the corresponding devices over the powerline.

Another object of the invention is the ability to provide a network control hub that will synchronize and allocate the channels for the service requested. This network control hub would provide universal interfaces that would be plugged into the power-line and communicate to such other compatible devices as Microsoft Corporation's "UPnP" and Sun Microsystem's "JINI"

The present invention provides differential voltage offset frequency OOK as a transmission technology using a base frequency of 1000 hertz. This base frequency can be adjusted to take advantage of the best signal to noise ratio. This 1000-hertz frequency is turned to the ON position when a binary 1 (one) is sent from a computer and turned to the OFF position when a 0 (zero) is present. Using conventional Manchester encoding and decoding, all control and timing information can be transmitted within the serial bit stream, however, other coding can be used. The information/data from a digital source (PC, Computer, Audio System, VCR, etc.) is transmitted into a buffer and then sent to the OOK modulator. This modulator controls the ON and OFF states of the base frequency transmissions. Each ON state of the base frequency transmitted is then sent as a forward biased low frequency sine wave with enough current to drive the circuit for the duration of the ON symbol. The signal is then sent into a Passive or Active coupler to be connected to the power-line bus. Only one of the above two couplers is active and attached to the power-line at a time. The transmitted signal is then received at the far end and decoupled using the Active or Passive decoupling device. The signal is received having a resistive load and input into an optocoupler device to convert and isolate the circuit. The receiver senses current and converts the current to voltage. Once the current has been converted to voltage, the voltage is sent to a differential operational amplifier (Op Amp) circuit and the signal is then amplified. Using a Low Voltage Differential Signal receiver, the wave form is converted into a square wave that the receiving communication device can convert into a binary 1 (one) logic state. The transmission is detected as a differential current event using the transmission initial conditions. By using a differential signal method and the T.E.M. waveform, standard noise conditions found in the power-line do not affect this transmission method. By providing a differential base voltage the noise floor on the transmission is raised and the transmission has an improvement on the SNR (Signal-to-Noise Ratio). The low frequencies used in the transmitter will be generated by voltage-controlled oscillators.

BRIEF DESCRIPTION OF THE DRAWINGS

The following description of the attached drawing will provide the needed information to show the advantages and objects of the invention.

DETAILED DESCRIPTION OF THE INVENTION

Figure 1:
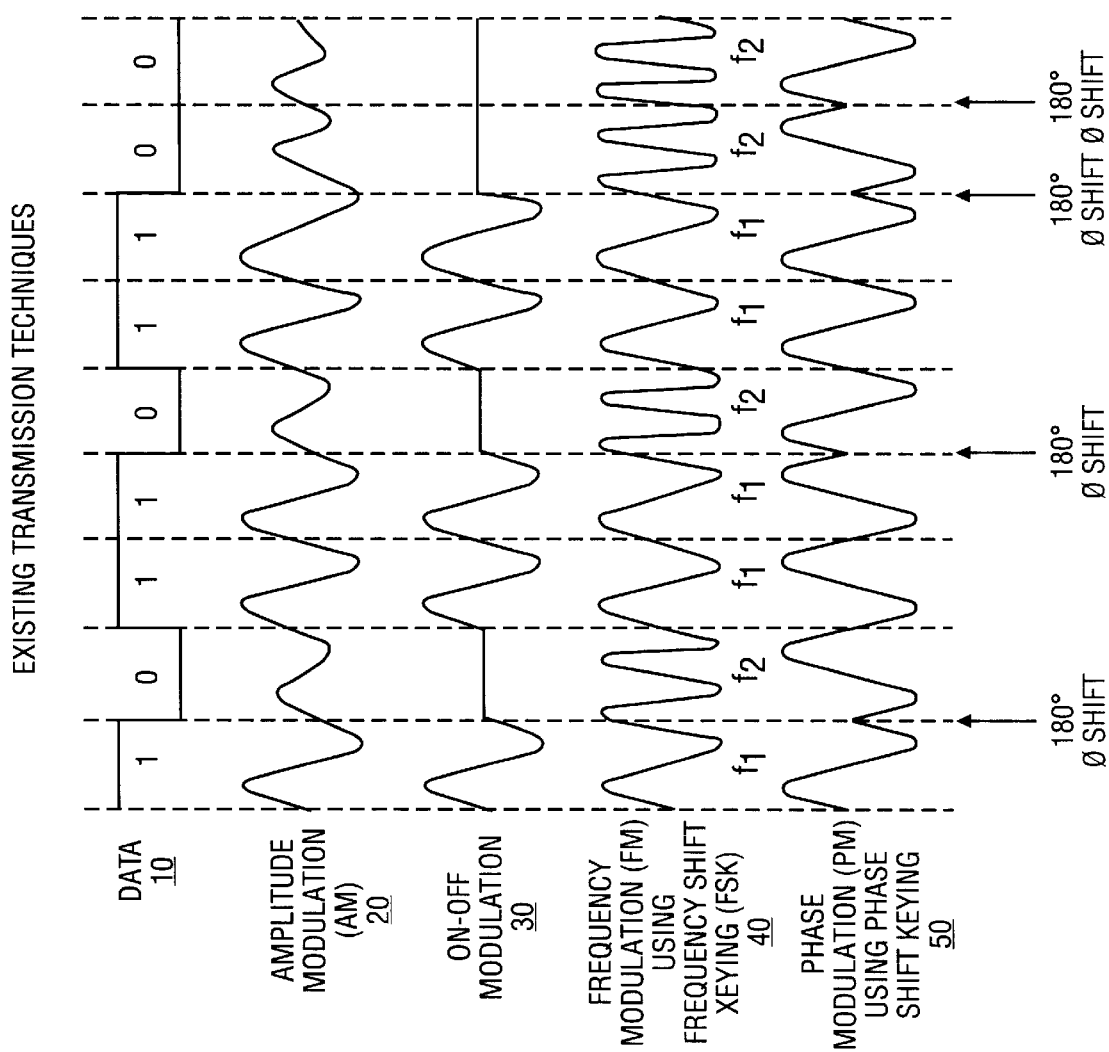
FIG. 1 is a diagram of the conventional modulation techniques used in today's transmission technology.

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

A method and apparatus for transmitting digital data over a power line are described. According to one embodiment of the present invention, the digital data is transmitted over the power line using a differential voltage, frequency offset, OOK transmission system that may include a home network hub, various network device interfaces for transmitting and receiving data, power-line couplers for transmitting data (transmitter data pump), power-line decouplers for receiving data, network device interface for transmitting and receiving data, and various interfaces and analog-to-digital (ADC) and digital-to-analog (DAC) converters.

Figure 2:
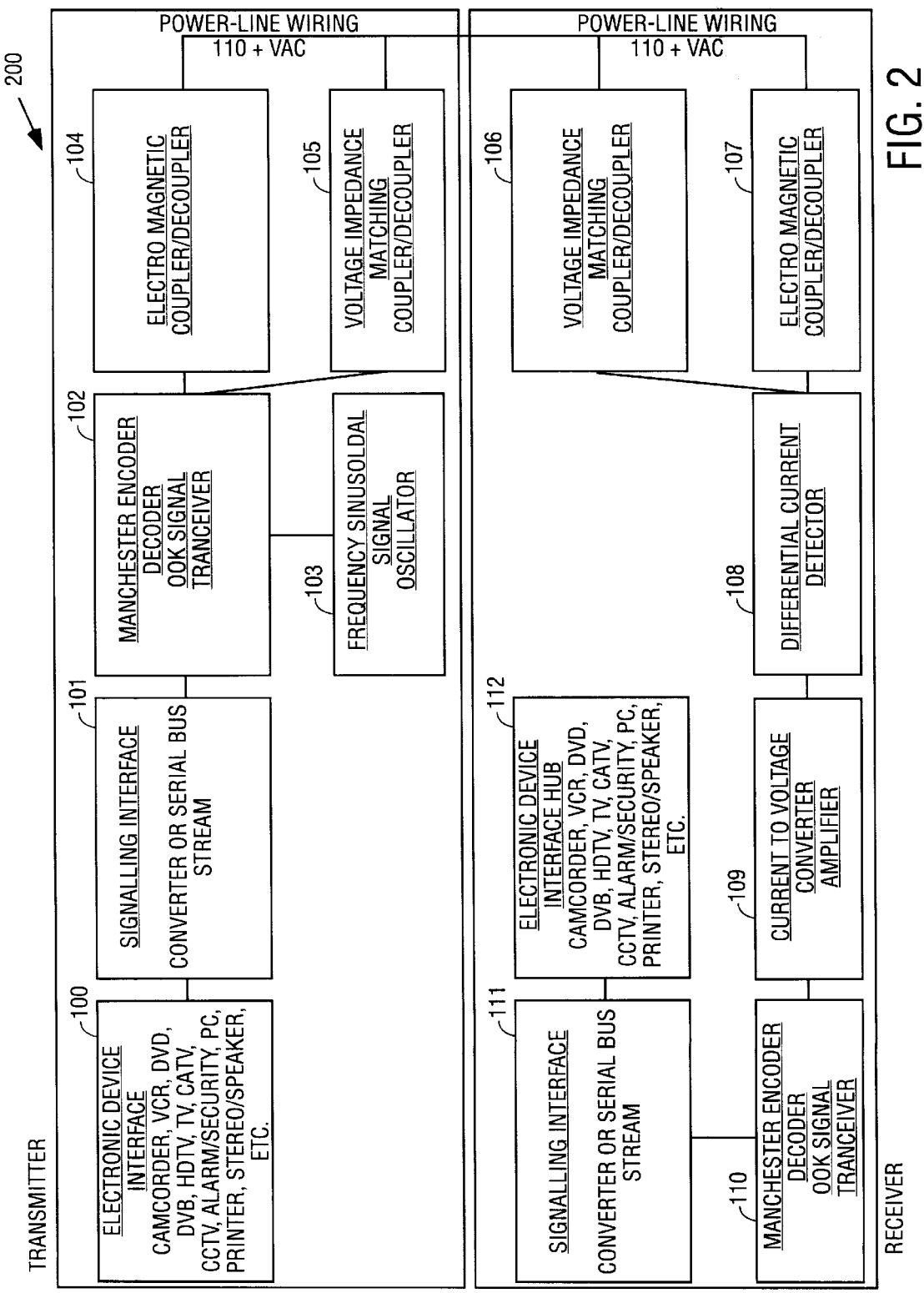
FIG. 2 is a diagram of the architecture of the receiver/transmitter (transceiver), according to one embodiment of the present invention.

Referring to FIG. 2, the architecture of transmitter/receiver (transceiver) of one embodiment of the present invention is illustrated. Various data source devices may use electronic device interface 100 to connect to base technology transceiver 200 of the differential voltage, frequency offset, OOK transmission technology. Examples of data source devices may include a digital video device, a printer, scanner or storage device, a Universal Serial Bus (USB) device, a cable TV, satellite or closed circuit TV device, a digital video broadcast device, an audio, stereo or speaker device, an infraded device, a Cebus 600 device, a telephone device, a camera or TV device, a radio or microwave device, and an Intercom device. Other examples of data source devices may include, but are not limited to, a transistor-transistor logic (TTL) device, an emitter coupled logic (ECL) device, a low voltage differential signaling (LVDS) device, a pseudo-emitter coupled logic (PECL) device, an HCMOS or CMOS device, an alarm or security device, a fiber optic interface device, a personal communications service (PCS) device, a personal computer device, a system-on-a-chip device, etc.

Device interface 100 outputs digital information (bits) into the input side of serial interface converter 101. This converter is necessary when parallel transmission methods are involved or when voltages need to be converted for interfacing. Serial interface converter 101 could be a device like Zilog Z16C30 that converts parallel data to serial data and buffers the transmission. The output side of serial interface device 101 provides TTL voltage levels and is connected to the control input lead of transceiver 102. It should be noted that other voltage levels, such as, for example, HCMOS, ECL, LVDS, or PECL voltage levels, can be provided by serial interface device 101. Transceiver 102 uses a modulator that provides control of the OOK signal through the TTL voltage level control lead. This modulator may be, for example, Maxim DG211 (normally closed quad analog switch). The modulator's input is connected to a frequency sinusoidal signal source (1 Khz) oscillator 103 such as Conner-Winfield DSP1. The input of oscillator 103 may feed into a Burr-Brown OPA650 type Operational Amplifier that will drive the transmission line. Transceiver 102 uses the modulator to turn the sinusoidal signal On and back Off to the level of the differential ground (floating ground). Tying the output signal to the differential ground together with a capacitor and resistor allows getting the desired transmission settling. According to experimental studies, the use of the OPA650 as a Wideband, Low Power Voltage Feedback Operational Amplifier drives the transmission up to 85 mA, with other compatible chips providing higher current drive levels when necessary.

Transceiver 102 is further coupled to electromagnetic coupler 104. Electromagnetic coupler 104 is used to connect the data circuit to the power-line wiring. Transceiver 102 is also coupled to voltage coupled impedance matching coupler 105 that connects to the power-line wiring. Couplers 104 and 105 are necessary to isolate the power-line AC voltages and wiring from transceiver 102. The dual coupled method allows transmitting the data regardless of whether the AC power-line is on or off. This is accomplished by using a relay of voltage coupler 105. The relay enables transmission of data from transceiver 102 to the power line via voltage coupler 105 when the power in the power line is turned off.

Referring again to FIG. 2, the architecture of the receiver of one embodiment of the present invention is illustrated. In this embodiment, the receiver includes electromagnetic decoupler 107 and voltage impedance matching decoupler 106 on the receiver side. Decouplers 106 and 107 connect to the power-line wiring to isolate the receiver from the AC power-line voltages and wiring. Decoupler 106 is provided with an AC relay which enables connection of decoupler 106 to the power line only when the AC power-line is turned off. Electromagnetic decoupler 107 and voltage coupler impedance matching decoupler 106 are both coupled to the input side of the differential current detector 108. Differential current detector 108 uses a differential photodiode transimpedance amplifier to detect the transmitted signal by using a Burr-Brown OPA602. The output side of differential current detector 108 is connected to current to voltage converter and amplifier 109. Using a photodiode amplifier connecting to a virtual floating ground current-to-voltage converter, such as Burr-Brown OPA128, allows to provide the output voltage source needed at demodulator 110. The output side of current to voltage converter and amplifier is connected to the input of demodulator 110 (e.g., Burr-Brown RCV420) which provides a 0–5 voltage TTL compatible signal that is input into serial interface 111. The output side of serial interface 111 is then connected to a computer or digital data receiving device 112.

Figure 3:
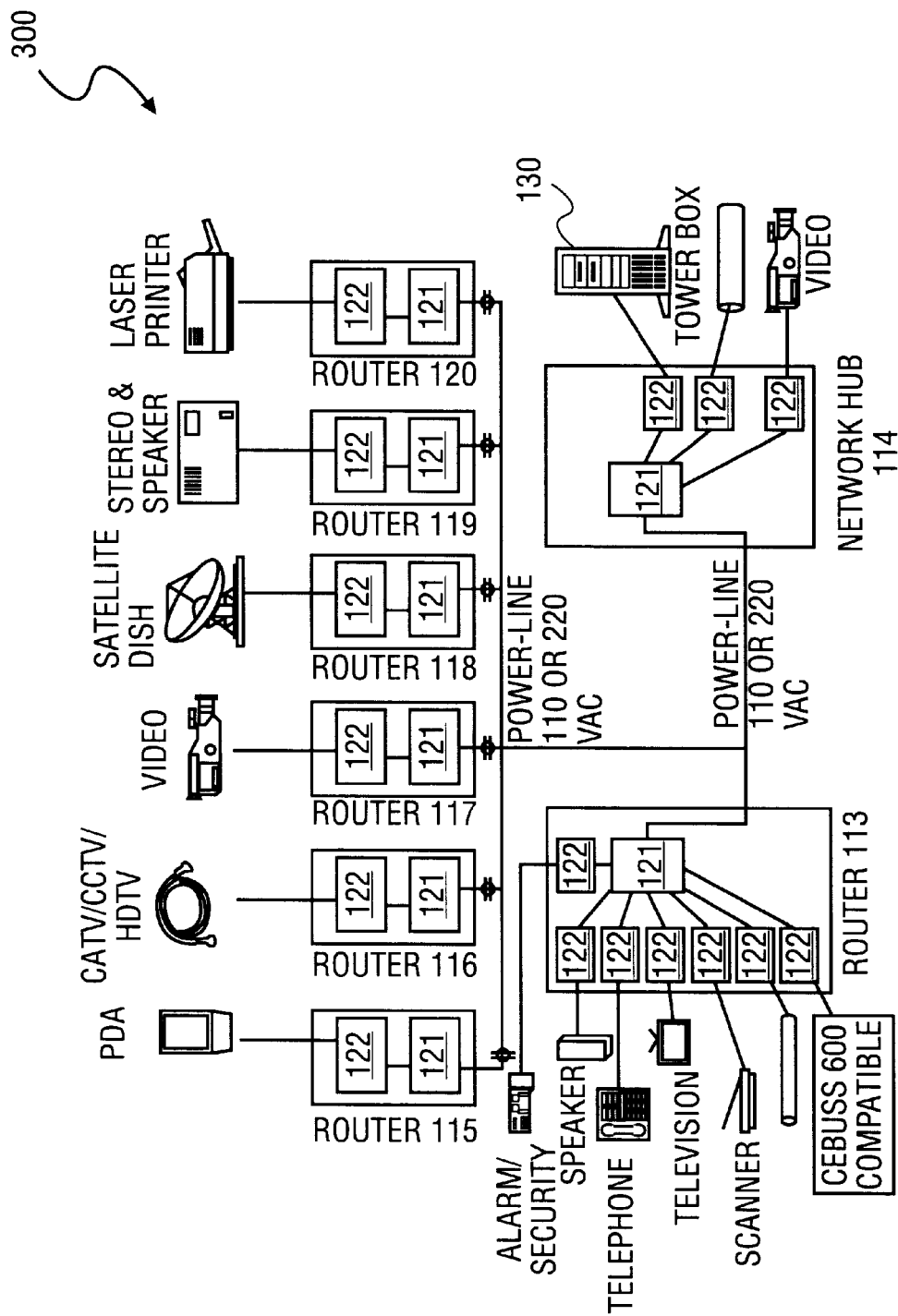
FIG. 3 is a diagram of one embodiment for connecting devices over the conventional power-line wiring in a home network system using the differential voltage, frequency offset OOK transmission technology of the present invention.

FIG. 3 is a diagram of one embodiment for connecting home network devices over the conventional power-line wiring using the differential voltage, frequency offset OOK transmission technology of the present invention. In this embodiment, each home network device is connected to the power line via a router which includes transceiver 121 and I/O interface 122. Transceiver 121 is used for power-line communication. I/O interface 122 provides I/O control, protocol conversion, buffering and mechanical connectivity to the devices interface, such as, RJ11 jack for telephone and SLIC (Subscriber Line Interface Circuit). Transceiver 121 is transceiver 200 of FIG. 2. Using the transmission technology of the present invention, router 113, for example, may be used to network-connect various types of conventional home network devices via the power-line network. As described above, home network devices may include, for example, a Cebus 600 compatible device, Ethernet network devices, a USB scanner, a Firewire speaker, an ADC/DAC telephone interface, an asynchronous alarm security device, etc. Cebus 600, Ethernet, USB, and Firewire standards and protocols are well-known to those of ordinary skill in the art.

FIG. 3 also illustrates other home network devices that may be connected to the power-line network using the devices and processes of the present invention. As shown in FIG. 3, router 115 is used to connect a personal digital assistant (PDA) or other infrared (IR) portable device to a base technology network hub 114 over the standard power-line wiring using the differential voltage, frequency offset, OOK transmission technology of the present invention. In this example, router 116 connects a cable television (CATV) or closed circuit television (CCTV) or high definition television (HDTV) protocol to the base technology network hub 114 over the power-line network. Another router 117 for the home network system connects a video camera device, using a conventional Firewire protocol, to the base technology network hub 114 over the power-line wiring using the differential voltage, frequency offset OOK transmission technology of the present invention. Similarly, router 118 connects a conventional satellite receiver device, using coaxial cable, router 119 connects a standard stereo and speaker device, using stranded audio wire, incorporating an ADC/DAC interface, and router 120 connects a standard printer device, using a parallel to serial converter, to the base technology network hub 114 over the power-line wiring using the differential voltage, frequency offset OOK transmission technology of the present invention.

Still referring to FIG. 3, network hub 114 includes transceiver 121 which controls clocking/timing, channelization and broadcasting of transmission over the power-line network. Network hub 114 also includes an embedded Operating System (OS) such as, Windows NT, network services and applications. Transceiver 121 uses such techniques as Manchester Encoding and PLL (Phase Lock Loop) to transmit and recover clocking/timing. Channelization may be provided using TDM (Time Division Multiplexing) with a minimum of 2 and a maximum of 256. Transmission of information will be accomplished by channels of asynchronous, isochronous and synchronous transmissions. Using asynchronous transmission high-speed data will be interchanged between devices. Isochronous transmission could be used for video broadcasting and telephone transmissions. Synchronous transmission will be used when clock cycles are needed between the transmitting and receiving devices. The information can be framed into various formats, such as, SDLC (Synchronous Data Link Control) HDLC (High-level Data Link Control) Frame Relay, X.25, ATM (Asynchronous Transfer Mode) for error checking, timing, headers, and addressing. Routing can be accomplished using a protocol such as an Internet protocol (IP). The routing of data outside of the network is necessary to communication with the outside world. A network server 130 can be connected at any point on the power-line network using one of the interfaces or ports on the network hub 114. Network server 130 may be used to perform Internet related operations, including receiving a protocol, such as IP, and directing and/or forwarding it to the correct address or device. Network hub 114 also includes, according to the standard hub configuration, a main memory, an input/output (I/O) device, a data storage device, a processor, etc. Transceiver 121 and I/O interface 122 included in network hub 114 may also provide protocol conversion when necessary.

Figure 4:
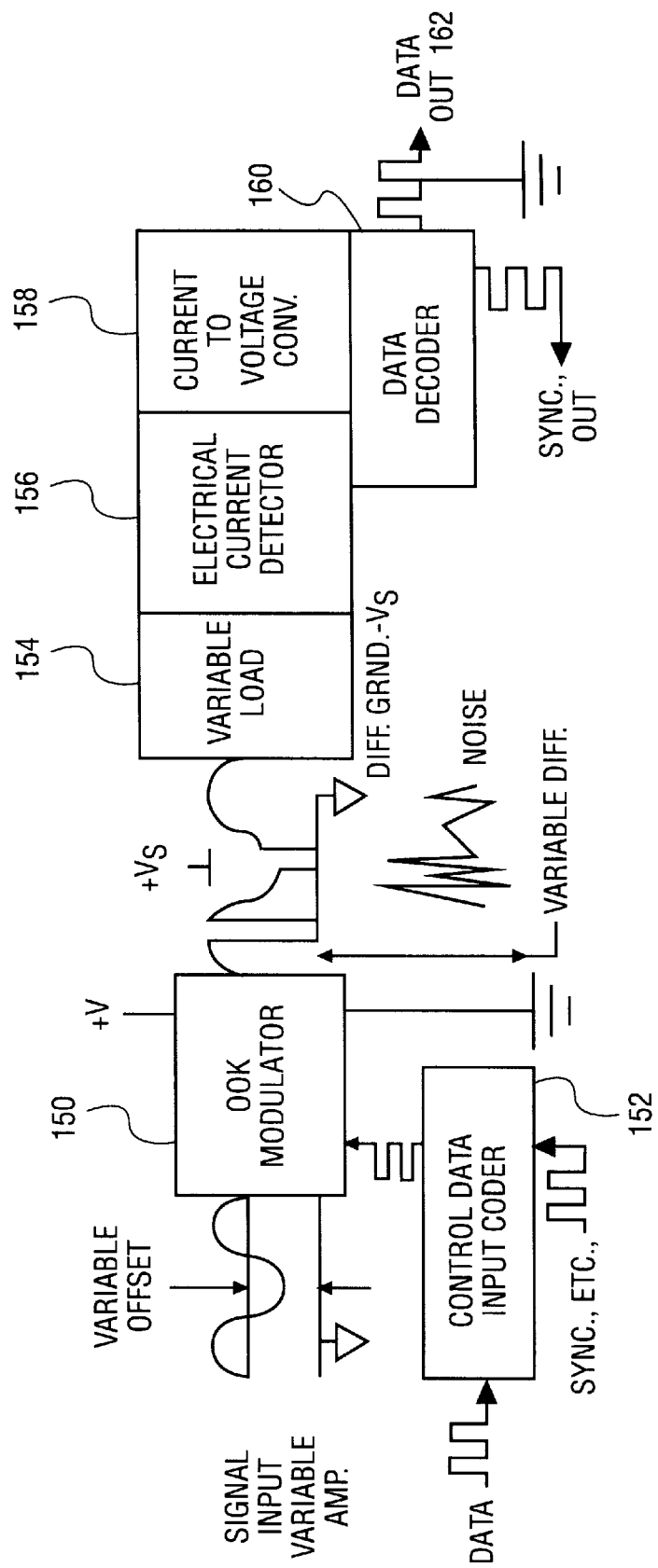
FIG. 4 is a diagram of the variable low frequency offset, differential voltage, OOK, high-speed communications transmission technique of the present invention.

FIG. 4 is a diagram of the variable low frequency offset, differential voltage, OOK, communications transmission technique, according to one embodiment of the present invention. In this embodiment, the above transmission technique may be used in various environments, including powerline and twisted pair environments.

Referring to FIG. 4, the signal input is generated by a sinewave oscillator (e.g., oscillator 103 of FIG. 2) and has a variable offset differential ground reference. The signal input enters modulator 150 (e.g., a modulator included in OOK signal transceiver of FIG. 2). Modulator 150 is controlled by the signal input along with encoded timing, control and synchronization information provided by control data input coder 152. The output generated by modulator 150 is totally above or below the system/earth ground reference. This provides the differential ground reference that may be varied by adjusting the differential voltage level above the noise floor of the transmission lines involved.

The amplitude of the signal coming out of modulator 150 is associated with a voltage signal Vs as shown in FIG. 4. The output signal of modulator 150 goes through variable load 154 which provides the current level sufficient for detection of current by the transmission system. This current level can be adjusted from 2 mA to 500 mA as required for signal detection. The signal detection is performed by electrical current detector 156. Electrical current detector 156 detects current with differential characteristics and passes this differential current to current to voltage converter 158. Electrical current detector 156 also provides for isolating a transmitter from a receiver, such as the transmitter and receiver of FIG. 2. Current to voltage converter 158 converts differential current into voltage and allows the receiver to transmit the data out at standard voltage levels. Decoder 160 removes timing, control and synchronous information bits out of the data stream to recreate the original data transmission. As described above, the timing, control and synchronous bits are used to coordinate the transmitter and receiver ends of the link. Afterwards, the output of the receiver (i.e., data out 162) is then sent to the digital device interface.

The method and system for transmitting data using a low frequency offset, differential voltage, OOK transmission technique have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for transmitting data using a differential voltage, frequency offset, OOK transmission, the method comprising:

receiving a data signal from a data source device;

providing a base frequency carrier;

controlling states of the base frequency carrier, the carrier states including an on state and an off state;

transmitting the data signal, using the base frequency carrier, to a power line via one of a pair of couplers, the pair of couplers corresponding to an active power line state and a passive power line state;

receiving the transmitted data signal from the power line by one of a pair of decouplers, the pair of decouplers corresponding to the active power line state and the passive power line state; and sending the data signal to a data receiving device.

2. The method of claim 1 wherein the passive power line state is detected when power in the power line is turned off and the active power line state is detected when the power in the power line is turned on.

3. The method of claim 1 further comprising transmitting control and timing information within a serial bit stream.

4. The method of claim 1 wherein the data signal is transmitted from the data source device to the data receiving device via the power line at a rate equal to an output rate of the data source device plus a transmission control overhead.

5. The method of claim 1 wherein a frequency of the base frequency carrier is set according to a minimum signal to noise ratio.

6. The method of claim 1 wherein the data signal is transmitted using the base frequency carrier as a forward biased low frequency wave.

7. A transmission system for transmitting data from a data source device to a data receiving device via a power line using a differential voltage, frequency offset, OOK transmission, the system comprising:

a transmitter to receive a data signal from the data source device, to provide a base frequency carrier, to control states of the base frequency carrier, the carrier states including an on state and an off state, and to transmit the data signal, using the base frequency carrier, to the power line via one of a pair of couplers, the pair of couplers corresponding to an active power line state and a passive power line state; and a receiver, coupled to the transmitter, to receive the transmitted data signal from the power line by one of a pair of decouplers, the pair of decouplers corresponding to the active power line state and the passive power line state, and to send the data signal to a data receiving device.

8. The system of claim 7 wherein the passive power line state is detected when power in the power line is turned off and the active power line state is detected when the power in the power line is turned on.

9. The system of claim 7 wherein the transmitter is to transmit control and timing information within a serial bit stream.

10. The system of claim 7 wherein the transmitter is configured to transmit the data signal to the data receiving device via the power line at a rate equal to an output rate of the data source device plus a transmission control overhead.

11. The system of claim 7 wherein a frequency of the base frequency carrier is set according to a minimum signal to noise ratio.

12. The system of claim 7 wherein the data signal is transmitted using the base frequency carrier as a forward biased low frequency wave.

* * * * *